United States Patent
Daughenbaugh et al.

(10) Patent No.: US 9,870,844 B2
(45) Date of Patent: *Jan. 16, 2018

(54) METHODS OF COATING AN ELECTRICALLY CONDUCTIVE SUBSTRATE AND RELATED ELECTRODEPOSITABLE COMPOSITIONS

(71) Applicant: PPG Industries Ohio, Inc., Cleveland, OH (US)

(72) Inventors: Randy E. Daughenbaugh, Monroeville, PA (US); Stuart D. Hellring, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 215 days.

This patent is subject to a terminal disclaimer.

(21) Appl. No.: 14/831,047

(22) Filed: Aug. 20, 2015

(65) Prior Publication Data

US 2015/0357079 A1    Dec. 10, 2015

Related U.S. Application Data

(63) Continuation-in-part of application No. 13/686,003, filed on Nov. 27, 2012, now Pat. No. 9,150,736.

(51) Int. Cl.
| | |
|---|---|
| *H01B 1/24* | (2006.01) |
| *C09D 5/44* | (2006.01) |
| *C09D 7/12* | (2006.01) |
| *C25D 13/16* | (2006.01) |
| *H01M 4/04* | (2006.01) |
| *H01M 4/136* | (2010.01) |
| *H01M 4/1397* | (2010.01) |
| *H01M 4/58* | (2010.01) |
| *H01M 4/62* | (2006.01) |
| *C25D 13/02* | (2006.01) |
| *C25D 15/00* | (2006.01) |
| *C25D 13/22* | (2006.01) |

(52) U.S. Cl.
CPC .............. *H01B 1/24* (2013.01); *C09D 5/448* (2013.01); *C09D 7/1216* (2013.01); *C25D 13/02* (2013.01); *C25D 13/16* (2013.01); *C25D 15/00* (2013.01); *H01M 4/0457* (2013.01); *H01M 4/136* (2013.01); *H01M 4/1397* (2013.01); *H01M 4/5825* (2013.01); *H01M 4/622* (2013.01); *C25D 13/22* (2013.01)

(58) Field of Classification Search
CPC ........ H01B 1/24; C09D 5/448; C09D 7/1216; C25D 13/02; C25D 13/16; C25D 15/00; C25D 13/22; C25D 13/00; C25D 17/00; H01M 4/0457; H01M 4/136; H01M 4/1397; H01M 4/5825; H01M 4/622; H01M 4/0438; H01M 4/08; H01M 4/139; H01M 4/661; H01M 4/02; H01M 4/525; H01M 4/808; H01M 6/18; H01M 6/181; H01M 6/40; H01M 10/0472; H01M 10/04; H01M 10/0436; H01M 10/052; H01M 10/0525; H01M 10/058; H01M 10/0565; H01M 10/44; H01M 2004/021; H01M 2004/025; Y02P 70/54; C08K 3/04; C08K 2201/002; C08K 2201/006; C08L 33/06; Y10S 524/901; G02F 1/1523; G02F 2001/1555; H01G 11/26; H01G 11/56; H01G 11/64; Y02E 60/13

See application file for complete search history.

(56) References Cited

U.S. PATENT DOCUMENTS

| | | | |
|---|---|---|---|
| 3,455,806 A | 7/1969 | Spoor et al. | |
| 4,452,963 A | 6/1984 | Moriarity | |
| 5,837,766 A * | 11/1998 | Metro | C08K 3/04 252/511 |
| 2005/0272214 A1 * | 12/2005 | Chiang | G02F 1/1523 438/309 |
| 2014/0144778 A1 | 5/2014 | Daughenbaugh et al. | |
| 2015/0017447 A1 | 1/2015 | Moravek et al. | |

FOREIGN PATENT DOCUMENTS

EP    2490284 A1    8/2012

\* cited by examiner

*Primary Examiner* — Xiuyu Tai
(74) *Attorney, Agent, or Firm* — Krisanne Shideler

(57) ABSTRACT

A method of producing an electrode for a lithium ion battery is disclosed in which an electrically conductive substrate is immersed into an electrodepositable composition, the substrate serving as the electrode in an electrical circuit comprising the electrode and a counter-electrode immersed in the composition, a coating being applied onto or over at least a portion of the substrate as electric current is passed between the electrodes. The electrodepositable composition comprises: (a) an aqueous medium; (b) an ionic (meth) acrylic polymer; and (c) solid particles comprising: (i) lithium-containing particles, and (ii) electrically conductive particles, wherein the composition has a weight ratio of solid particles to ionic (meth)acrylic polymer of at least 4:1.

32 Claims, No Drawings

METHODS OF COATING AN ELECTRICALLY CONDUCTIVE SUBSTRATE AND RELATED ELECTRODEPOSITABLE COMPOSITIONS

CROSS-REFERENCE TO RELATED APPLICATION

This application is a continuation-in-part of copending application Ser. No. 13/686,003, filed Nov. 27, 2012.

FIELD

The present invention relates to methods of producing a lithium ion battery by electrodeposition. The present invention is also related to electrodepositable compositions for producing a lithium ion-containing battery.

BACKGROUND

Electrodeposition as a coating application method involves the deposition onto an electrically conductive substrate of a composition under the influence of an applied electrical potential. A coating is deposited as the substrate is immersed in the composition, the substrate serving as an electrode in an electrical circuit of the electrode and a counter-electrode immersed in the composition, the coating being applied to the substrate as electric current is passed between the electrodes.

Often, the composition used in an electrodeposition process includes a resinous phase dispersed in an aqueous medium. While the composition into which the substrate is immersed may include pigments to provide color and other fillers and additives, the properties historically sought by electrodeposited coatings, such as outstanding corrosion resistance, arise primarily because of the deposition of a continuous resinous film. Therefore, the resin content of the composition into which the substrate is immersed is relatively high in relation to the amount of pigment and other fillers. For example, such compositions usually contain 0.02 to 1 parts by weight pigment to 1 part by weight resinous phase.

Lithium ion batteries consist of a cathode, an anode, a separator, and an electrolyte. The cathode is a metal (often aluminum) foil substrate having a lithium-containing active material, such as $LiFePO_4$, deposited thereon. The lithium-containing active material is deposited on the substrate from a slurry containing the lithium-containing active material, conductive carbon, and binder (such as polyvinylidene difluoride) in organic solvent (such as n-methyl-2-pyrrolidone) via a slot die coater. In these slurries, the sum of the amount of lithium-containing active material and conductive carbon is high relative to the amount of binder, typically at least 9 parts by weight to 1 part by weight. The use of such solvent-borne slurries is, however, environmentally undesirable.

As a result, alternative methods and compositions for depositing lithium-containing compositions on a metal foil are desired. The present invention was made in view of the foregoing.

SUMMARY OF THE INVENTION

The present invention is directed to a method of producing an electrode for a lithium ion battery. The method comprises immersing an electrically conductive substrate into an electrodepositable composition, the substrate serving as the electrode in an electrical circuit comprising the electrode and a counter-electrode immersed in the composition, a coating being applied onto or over at least a portion of the substrate as electric current is passed between the electrodes. The electrodepositable composition used in this method comprises: (a) an aqueous medium; (b) an ionic (meth)acrylic polymer, and (c) solid particles comprising: (i) lithium-containing particles, and (ii) electrically conductive particles and has a weight ratio of solid particles to ionic (meth)acrylic polymer of at least 4:1.

The present invention is also directed to electrodepositable compositions comprising: (a) an aqueous medium; (b) an ionic (meth)acrylic polymer; and (c) solid particles comprising: (i) lithium-containing particles, and (ii) electrically conductive particles, wherein the composition has a weight ratio of solid particles to ionic (meth)acrylic polymer of at least 4:1.

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about", Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As used herein, the term "polymer" refers to copolymers and oligomers.

The term "(meth)acrylic" refers to both acrylic and methacrylic monomers and polymers.

In certain embodiments, the substrate is embodied in the form of a sheet, coil, or foil. As used herein, the term "foil" refers to a thin and pliable sheet of metal. Such foils may be constructed of for example, aluminum, iron, copper, manganese, nickel, combinations thereof, and/or alloys thereof. In certain embodiments, the thickness of the foil, such as a foil comprising aluminum, is no more than 8 mils (203.2 µm), such as no more than 4 mils (101.6 µm), no more than 2 mils (50.8 µm), or, in some cases no more than 1 mil (25.4 µm), and/or at least 0.1 mil (2.54 µm), such as at least 0.2 mil (5.08 µm), at least 0.4 mils (10.2 µm), or at least 0.5 mil (12.7 µm).

The methods of the present invention comprise immersing the electrically conductive substrate into an electrodepositable composition, the substrate serving as an electrode for a lithium ion battery in an electrical circuit comprising the electrode and a counter-electrode immersed in the composition, a coating being applied onto or over at least a portion of the substrate as electric current is passed between the electrodes.

As used herein, the term "electrodepositable composition" refers to a composition that includes components that are electrodepositable. As used herein, the term "electrodepositable" means capable of being deposited onto an electrically conductive substrate under the influence of an applied electrical potential.

The electrodepositable compositions used in the methods of the present invention comprise an aqueous medium. As used herein, the term "aqueous medium" refers to a medium that either consists exclusively of water or comprises predominantly water in combination with inert organic cosolvent(s).

In certain embodiments, the aqueous medium is present in the composition used in the methods of the present invention in an amount of at least 75 percent by weight, at least 90 percent by weight, or at least 95 percent by weight, such as 75 to 99.5 percent by weight, 90 to 99 percent by weight, or, in some cases, 95 to 99 percent by weight, based on the total weight of the composition. In other words, the compositions used in the methods of the present invention may have a relatively low total solids content, as described further below.

The electrodepositable compositions used in the methods of the present invention comprise an ionic (meth)acrylic polymer. As used herein, the term "ionic" refers to a (meth)acrylic polymer that carries a charge, including (meth)acrylic polymers that carry a negatively charged ion and (meth)acrylic polymers that carry a positively charged ion. Suitable ionic (meth)acrylic polymers include, therefore, anionic (meth)acrylic polymers and cationic (meth)acrylic polymers.

Suitable anionic (meth)acrylic polymers contain at least partially neutralized anionic groups, such as acid groups, such as carboxylic acid groups, which impart a negative charge. Non-limiting examples of suitable anionic (meth)acrylic polymers, therefore, include base-neutralized, carboxylic acid group-containing polymers.

The ionic (meth)acrylic polymers are water dispersible. As used herein, a "water dispersible ionic (meth)acrylic polymer" means that the polymer is capable of being distributed throughout water as finely divided particles. See R. Lewis, Sr., Hawley's Condensed Chemical Dictionary, (12th Ed. 1993) at page 435.

Examples of (meth)acrylic polymers are those which are prepared by polymerizing mixtures of (meth)acrylic monomers. The (meth)acrylic polymer contains carboxylic acid moieties that are introduced into the polymer from the use of (meth)acrylic carboxylic acids. The carboxylic acid functionality provides sites for subsequent neutralization with a base such as an organic amine to stabilize the polymer dispersed in aqueous medium. The unsaturated carboxylic acid will constitute from 20 to 60, such as 30 to 50 percent by weight of the total weight of monomers used in preparing the (meth)acrylic polymer. Examples of (meth)acrylic carboxylic acids are acrylic acid and (meth)acrylic acid.

The (meth)acrylic polymer typically contains a "soft" polymer segment from the use of a monomer having a glass transition temperature of −20° C. or less. Examples of such monomers are alkyl acrylates containing from 4 to 8 carbon atoms in the alkyl group such as butyl acrylate and 2-ethylhexyl acrylate. Such monomers will constitute from 30 to 70, such as 40 to 60 percent by weight of the total weight of the monomers used in preparing the (meth)acrylic polymer.

Glass transition temperatures (Tg) of (meth)acrylic monomers are widely reported in the literature. Examples of (meth)acrylic monomers and Tgs lows:

| Monomer | Tg, ° C. |
|---|---|
| Methacrylic acid | 228 |
| Acrylic acid | 105 |
| Hydroxyethyl methacrylate | 57 |
| Butyl methacrylate | 20 |
| 2-Ethylhexyl acrylate | −50 |
| n-Butyl acrylate | −54 |

Examples of other (meth)acrylic monomers that can be used in preparing the (meth)acrylic polymers are alkyl methacrylates containing from 4 to 6 carbon atoms in the alkyl group such as butyl methacrylate and hexyl methacrylate and alkyl acrylates having 1 to 3 carbon atoms in the alkyl group such as methyl acrylate and ethyl acrylate. These (meth)acrylic monomers typically constitute up to 20 percent by weight based on total weight of monomers used in preparing the (meth)acrylic polymer.

Vinyl monomers can optionally be used in preparing the (meth)acrylic polymer. Examples of such monomers are vinyl aromatic monomers such as styrene and alpha-methyl styrene. If used, these monomers constitute up to 10 percent by weight based on total weight of monomers used in preparing the (meth)acrylic polymer.

The (meth)acrylic polymer typically has a glass transition temperature of less than 20° C., such as less than 0° C. to provide the necessary flexibility in the resultant electrodeposited coating. The term "glass transition temperature" (Tg) is a theoretical value being the glass transition temperature as calculated by the method of Fox on the basis of monomer composition of the monomer charges according to T. G. Fox, Bull. Am. Phys. Soc. (Se. II) 1, 123 (1056) and J. Brandrup, E. H. Immergut, Polymer Handbook 3$^{rd}$ edition, John Wiley, New York, 1989.

The (meth)acrylic polymers will typically have molecular weights of at least 2000, such as 4000 to 500,000 on a weight average basis (Mw) as determined by gel permeation chromatography using polystyrene standards.

The electrodepositable compositions are typically thermosetting in nature by the presence of curing agent. The curing agents can be integral with the (meth)acrylic polymer or they can be present as a separate component.

Curing agents which are integral with the (meth)acrylic polymer are incorporated into the polymer by including within the monomer charge polymerizable (meth)acrylic monomers containing self-curing groups. Examples of monomers which contain self-curing groups include N-methylol ether derivatives of acrylic and methacrylic amides. When these monomers are employed, they constitute up to 30, such as up to 20 percent by weight of the monomers used in preparing the (meth)acrylic polymer. Such self-curing groups are stable when the (meth)acrylic polymer-containing compositions are at room temperature, that is, about 20°-25° C., but under the influence of heat, are reactive with each other or with other active hydrogen groups in the polymer such as hydroxyl groups and carboxylic acid groups to crosslink the polymer. Suitable N-methylol ether derivatives of acrylic acid and methacrylic acid amides are N-butoxymethyl acrylamide and N-methoxymethyl methacrylamide.

Besides self-curing (meth)acrylic polymers, thermosetting compositions can be formed from (meth)acrylic polymers containing active hydrogens and a curing agent which is present in the coating composition as a separate component, for example, an aminoplast. The curing agent is one which is stable in the presence of the active hydrogen-containing acrylic polymer at room temperature, that is 20°-25° C., but is reactive with the active hydrogens under the influence of heat to form a cured or crosslinked product.

Active hydrogens are incorporated into the (meth)acrylic polymer by including with the monomer charge monomers containing hydroxyl groups. Examples of (meth)acrylic monomers containing hydroxyl groups are hydroxyalkyl acrylates and methacrylates. Preferably, the hydroxyalkyl group will contain from 2 to 4 carbon atoms and examples would include hydroxyethyl acrylate, hydroxyethyl methacrylate, hydroxypropyl acrylate and hydroxypropyl methacrylate.

The (meth)acrylic monomers containing the active hydrogens (exclusive of the carboxylic acid containing monomer) can be used in amounts of up to 30, usually up to 15 percent by weight, based on total weight of the monomers used in preparing the (meth)acrylic polymer.

As mentioned above, the externally added curing agent is one which is stable with the (meth)acrylic polymer at room temperature (20°-25° C.) but reactive with the active hydrogens of the (meth)acrylic polymer at elevated temperature, that is, 135-200° C., to form a cured or crosslinked product. Preferred curing agents are water-soluble or water-dispersible aminoplasts. The aminoplasts are aldehyde condensation products of melamine, benzoguanamine, urea or similar compounds. Generally, the aldehyde employed is formaldehyde, although useful products can be made from other aldehydes such as acetaldehyde, crotonaldehyde, acrolein, benzaldehyde, furfural and others. Condensation products of melamine, urea or benzoguanamine are most common and are preferred but products of other amines and amides in which at least one amino group is present can also be employed. For example, such condensation products can be produced from various diazines, triazoles, guanidines, guanamines and alkyl and di-substituted derivatives of such compounds including alkyl and aryl-substituted ureas and alkyl and aryl-substituted melamines and benzoguanamines. Examples of such compounds are N,N-dimethyl urea, N-phenyl urea, dicyandiamide, formoguanamine, acetoguanamine, 6-methyl-2,4-diamino-1,3,5-triazine, 3,5-diaminotriazole, triaminopyrimidine, 2,4,6-triethyltriamine-1,3,5-triazine and the like.

These amine-aldehyde condensation products contain methylol groups or similar alkylol groups depending upon the particular aldehyde employed. If desired, these methylol groups can be etherified by reaction with an alcohol. Various alcohols are employed for this purpose including essentially any monohydric alcohol, although the preferred alcohols contain from 1 to 4 carbon atoms such as methanol, ethanol, isopropanol and n-butanol.

The (meth)acrylic polymer can be prepared by free radical initiated solution polymerization techniques in which the polymerizable monomers are dissolved in organic solvent and polymerized in the presence of a free radical initiator such as azobisisobutyronitrile or benzoyl peroxide. Alternatively, the (meth)acrylic polymer can be prepared in aqueous medium by emulsion polymerization techniques.

To prepare the (meth)acrylic polymer by solution polymerization techniques, the solvent is first heated to reflux and the mixture of polymerizable monomers containing the free radical initiator is added slowly to the refluxing solvent. The reaction mixture is held at polymerizing temperatures so as to reduce the free monomer content to below 1.0 and usually below 0.5 percent.

The (meth)acrylic polymer prepared as described above typically has a molecular weight on a weight average basis of about 2000 to 50,000, such as 4000 to 25,000.

The acid group-containing (meth)acrylic polymer is treated with a base to form a water-dispersible salt thereof. Examples of suitable bases are inorganic bases such as sodium and potassium hydroxides. Preferably the base is an amine. Examples of suitable amines are water-soluble amines including ammonia, primary, secondary and tertiary amines including hydroxyalkyl amines. Examples include ethanolamine, diethanolamine, N-methylethanolamine, ethylamine and diethylamine. The acid group-containing polymer is at least partially neutralized, usually to the extent of at least 20 and more usually at least 40 percent of the total theoretical neutralization.

After the acid group-containing (meth)acrylic polymer has been treated with a base, it is dispersed in aqueous medium. The step of dispersion is accomplished by combining the neutralized or partially neutralized polymer with the aqueous medium. Neutralization and dispersion can be accomplished in one step by combining the acid group-containing acrylic polymer and aqueous medium which contains the base. The polymer (or its salt) can be added to the aqueous medium or the aqueous medium added to the polymer (or its salt). The pH of the dispersion is preferably within the range of 7.0 to 9.0.

The (meth)acrylic polymers can also be prepared by emulsion polymerization techniques well known in the art. Examples of suitable techniques involve the pre-emulsification technique and the seeding technique. In the pre-emulsification technique, a small amount of water is present in the polymerization vessel together with a polymerization initiator and optionally all or part of the emulsifying agent. The monomer charge is emulsified in a larger amount of water and is continuously added to the reaction vessel under polymerizing conditions. If all the emulsifier is not present initially in the reaction vessel, it can be added simultaneously with the monomer addition. Alternately, the total amount of water may be present in the reaction vessel and the monomers added in bulk form.

In the seeding technique, a small amount of the monomer charge is added to the reaction vessel along with all or part of the polymerization initiator and all or part of the emulsifier and polymerized to form a seed latex. After formation of the seed latex, the remaining polymerization ingredients are added in a continuous manner to the reaction vessel under polymerizing conditions to form the final polymer emulsion.

The (meth)acrylic polymers prepared as described above typically have molecular weights on a weight average basis of about 25,000 to 500,000, such as 50,000 to 100,000 as determined by gel permeation chromatography using polystyrene standards.

To form the ionic salt of the (meth)acrylic monomer, the latices are rendered alkaline in pH in the range of 7.5 to 9.5 by adding ammonia or a water-soluble amine to the latex.

In other embodiments of the present invention, the ionic resin comprises a cationic salt group-containing resin. Suitable cationic salt-group containing resins include resins that contain at least partially neutralized cationic groups, such as sulfonium groups and amine groups, which impart a positive charge.

The cationic resin may comprise a water soluble cationic resin. In certain embodiments, the water soluble cationic resin comprises a poly($C_{2-4}$)-alkyleneimine, which can be linear or branched, specific examples of which include polyethyleneimines (PEIs). As will be appreciated, PEIs are made by a ring opening polymerization of ethylenamine. Other suitable water soluble cationic resins include poly (allylamine hydrochloride), poly(acrylamide-co-diallyldimethylammonium chloride) and poly(2-methacryloxyethyltrimethylammonium chloride). In certain embodiments, the water soluble cationic resin, such as those mentioned above, has a weight average molecular weight of at least 5,000, such as at least 10,000, or, in some cases, 5,000 to 50,000, or, in some cases 10,000 to 25,000 as determined by gel permeation techniques using polystyrene standards.

Typically, the water soluble cationic resin, such as a PEI, is present in an amount of at least 50 percent by weight, such as at least 60 percent by weight, at least 70 percent by weight, at least 80 percent by weight, or, in some cases, at least 90 percent by weight, based on the total weight of resin in the composition. In certain embodiments, the water soluble cationic resin, such as a PEI, is present in an amount of no more than 20 percent by weight, no more than 15 percent by weight, no more than 10 percent by weight, no more than 5 percent by weight, such as 1 to 20 percent by weight, 1 to 15 percent by weight, 5 to 15 percent by weight, or, in some cases, 1 to 3 percent by weight, based on the total weight of solids in the composition.

The composition may comprise a water dispersible cationic resin. Examples of water dispersible cationic resins that are suitable for use in the compositions described herein are active hydrogen-containing, cationic salt group-containing resins. As used herein, the term "active hydrogen-containing, cationic salt group-containing resin" refers to resins that include active hydrogen functional groups and at least partially neutralized cationic groups. Examples of resins that are suitable for use as the active hydrogen-containing, cationic salt group-containing resin in the present invention include, but are not limited to, alkyd resins, acrylics, polyepoxides, polyamides, polyurethanes, polyureas, polyethers, and polyesters, among others.

More specific examples of suitable active hydrogen-containing, cationic salt group containing resins include polyepoxide-amine adducts, such as the adduct of a polyglycidyl ethers of a polyphenol, such as bisphenol A, and primary and/or secondary amines, such as are described in U.S. Pat. No. 4,031,050 at col. 3, line 27 to col. 5, line 50, U.S. Pat. No. 4,452,963 at col. 5, line 58 to col. 6, line 66, and U.S. Pat. No. 6,017,432 at col. 2, line 66 to col. 6, line 26, these portions of which being incorporated herein by reference. In certain embodiments, a portion of the amine that is reacted with the polyepoxide is a ketamine of a polyamine, as is described in U.S. Pat. No. 4,104,147 at cot. 6, line 23 to col. 7, line 23, the cited portion of which being incorporated herein by reference. Also suitable are ungelled polyepoxide-polyoxyalkylenepolyamine resins, such as are described in U.S. Pat. No. 4,432,850 at col. 2, line 60 to col. 5, line 58, the cited portion of which being incorporated herein by reference. In addition, cationic acrylic resins, such as those described in U.S. Pat. No. 3,455,806 at col. 2, line 18 to col. 3, line 61 and U.S. Pat. No. 3,928,157 at col. 2, line 29 to col. 3, line 21, these portions of both of which being incorporated herein by reference, can be used.

Besides amine salt group-containing resins, quaternary ammonium salt group-containing resins can also be employed as a cationic salt group-containing resin in the compositions described herein. Examples of these resins are those which are formed from reacting an organic polyepoxide with a tertiary amine acid salt. Such resins are described in U.S. Pat. No. 3,962,165 at col. 2, line 3 to col. 11, line 7, U.S. Pat. No. 3,975,346 at col. 1, line 62 to col. 17, line 25, and U.S. Pat. No. 4,001,156 at col. 1, line 37 to col. 16, line 7, these portions of which being incorporated herein by reference. Examples of other suitable cationic resins include ternary sulfonium salt group-containing resins, such as those described in U.S. Pat. No. 3,793,278 at col. 1, line 32 to col. 5, line 20, this portion of which being incorporated herein by reference. Also, cationic resins which cure via a transesterification mechanism, such as described in European Patent Application No. 12463B1 at p. 2, line 1 to p. 6, line 25, this portion of which being incorporated herein by reference, can also be employed.

Other suitable cationic salt group-containing resins include those that may form photodegradation resistant electrodepositable coating compositions. Such resins include the resins comprising cationic amine salt groups which are derived from pendant and/or terminal amino groups that are disclosed in United States Patent Application Publication 2003/0054193 A1 at [0064] to [0088], this portion of which being incorporated herein by reference. Also suitable are the active hydrogen-containing, cationic salt group-containing resins derived from a polyglycidyl ether of a polyhydric phenol that is essentially free of aliphatic carbon atoms to which are bonded more than one aromatic group, which are described in United States Patent Application Publication US 2003/0054193 A1 at [0096] to [0123], this portion of which being incorporated herein by reference.

The compositions comprising a cationic resin composition may comprise a water soluble cationic resin, such as a PEI, and a water dispersible cationic resin, different from the PEI, wherein the water dispersible cationic resin is present in the composition in an amount of less than 50 percent by weight, such as less than 40 percent by weight, less than 30 percent by weight, less than 20 percent by weight, or, in some cases, less than 10 percent by weight, based on the total weight of cationic resin in the composition.

As will be appreciated, in adapting the cationic resin to be solubilized or dispersed in an aqueous medium, the resin is at least partially neutralized by, for example, treating with an acid. Non-limiting examples of suitable acids are inorganic acids, such as phosphoric acid and sulfamic acid, as well as organic acids, such as, acetic acid and lactic acid, among others. Besides acids, salts such as dimethylhydroxyethylammonium dihydrogenphosphate and ammonium dihydrogenphosphate can be used. In certain embodiments, the cationic resin is neutralized to the extent of at least 50 percent or, in some cases, at least 70 percent, of the total theoretical neutralization equivalent. The step of solubilization or dispersion may be accomplished by combining the neutralized or partially neutralized resin with the water.

The composition further includes a curing agent to react with the active hydrogen groups of the cationic salt group containing resin described above. Non-limiting examples of suitable curing agents are polyisocyanates, including at least partially blocked polyisocyanates, aminoplast resins and phenolic resins, such as phenolformaldehyde condensates including allyl ether derivatives thereof.

The electrodepositable compositions comprise lithium-containing particles, such as, for example, $LiCoO_2$, $LiNiO_2$, $LiFePO_4$, $LiCoPO_4$, $LiMnO_2$, $LiMn_2O_4$, $Li(NiMnCo)O_2$, and/or $Li(NiCoAl)O_2$. The lithium-containing particles typically have an average particle size, prior to incorporation into the composition, of no more than 10 micron, no more than 5 micron, no more than 3 micron, no more than 1 micron, such as 10 nanometers to 1,000 nanometers, or, in some cases 500 nanometers to 1,000 nanometers or 600 nanometers to 800 nanometers.

The lithium-containing solid particles are present in the electrodepositable composition in an amount of at least 50 percent by weight, at least 60 percent by weight, at least 70 percent by weight, at least 80 percent by weight, such as at least 85 percent by weight, or, in some cases, at least 90 percent by weight, based on the total weight of solids in the composition.

In addition to the lithium-containing particles, the electrodepositable composition comprises electrically conductive particles, such as electrically conductive carbon particles. Suitable electrically conductive particles include electrically conductive carbon blacks. Examples of commercially available electrically conductive carbon blacks, that are suitable for use herein, include, but are not limited to, Cabot Monarch™ 1300, Cabot XC-72R, Black Pearls 2000 and Vulcan XC 72 sold by Cabot Corporation; Acheson Electrodag™ 230 sold by Acheson Colloids Co.; Columbian Raven™3500 sold by Columbian Carbon Co.; and Printex™ XE 2, Printex 200, Printex L and Printex L6 sold by DeGussa Corporation, Pigments Group, and Super P® and Super P® Li, C-Nergy™ Super C45 and C-Nergy™ Super C65 sold by TIMCAL Ltd.

The electrically conductive carbon particles typically have an average particle size, prior to incorporation into the composition, of less than 300 nanometers, such as 1 to 200 nanometers, 10 to 100 nanometers, or, in some cases, 30 to 50 nanometers.

The electrically conductive carbon particles are typically present in the composition in an amount such that the relative weight ratio of lithium-containing particles to electrically conductive particles in the composition is at least 3:1, at least 4:1, at least 5:1, at least 8:1, at least 10:1, or, in some cases, at least 15:1. The electrically conductive carbon particles are present in an amount of no more than 20 percent by weight, no more than 10 percent by weight, such as 1 to 10 percent by weight, or 1 to 5 percent by weight, based on the total weight of the solids in the composition.

The electrodepositable composition may include other typical ingredients, such as adjuvant polymers such as polyvinylidene difluoride, corrosion inhibitors, anti-oxidants, flow control agents and surfactants.

The compositions described above can be prepared in any desired manner, including the methods described in the Examples. For example, in some embodiments, it may be desirable to incorporate the solid particles by means of a composition in which the solid particles are mixed with ionic (meth)acrylic polymer that has been pro-solubilized in an aqueous medium. The solids content of such a composition may be relatively high, such as 2 times, 3 times, or 4 times or more the total solids content of the composition in the methods of the present invention. The composition may be mixed, such as by sonication, to provide a uniform dispersion. This sonication may take 15 to 30 minutes or more. The resulting composition may then subsequently be combined with further liquid carrier, i.e., water and optionally organic solvent, to provide the final composition for use in the methods of the present invention.

In the method of the present invention, the substrate is immersed in a composition that has a weight ratio of solid particles (lithium-containing particles and carbon particles) to ionic polymer of at least 4:1, such as at least 5:1, at least 6:1, at least 7:1, at least 8:1, at least 9:1, at least 10:1, at least 11:1, at least 12:1, at least 13:1, at least 14:1, at least 15:1, at least 16:1, at least 17:1, or higher. Moreover, the substrate is immersed in a composition that has a total solids content of 0.5 to 25 percent by weight, such as 1 to 10 percent by weight, or, in some cases, 1 to 5 percent by weight, based on the total weight of the composition. Indeed, it has been discovered that such compositions can be provide stable dispersions of the solid particles and ionic polymer in an aqueous medium, even without the use of a thickener. As used herein, the term "stable dispersion" refers to a dispersion that does not gel, flocculate or precipitate when maintained at a temperature of 25° C. for at least 60 days, or, if some precipitation does occur, the precipitate can be radispersed upon agitation.

Moreover, it has been discovered that when such compositions are used in the methods of the present invention, even when the weight ratio of solid particles (such as lithium-containing particles in combination with electrically conductive carbon particles) to ionic polymer in the bath is within the foregoing ranges, a solid uniform coating of a suitable film thickness and limited porosity can be provided, which may make the foregoing methods particularly suitable for manufacturing coated substrates that may be used as a cathode for a lithium ion battery.

In the methods of the present invention, a coating is applied onto or over at least a portion of the substrate via an electrodeposition process. In such a process, an electrically conductive substrate (such as any of those described earlier) serving as an anode in an electrical circuit comprising the anode and cathode is immersed in a composition of the type described above. An electric current is passed between the electrodes to cause the coating to deposit on the anode. The applied voltage may be varied and can be, for example, as low as one volt to as high as several thousand volts, but is often between 50 and 500 volts. The current density is often between 0.5 ampere and 15 amperes per square foot. In certain embodiments, the residence time of the substrate in the composition is from 30 to 180 seconds.

After electrocoating, the substrate is removed from the bath and may, in certain embodiments and depending upon the particulars of the composition and the preferences of the end user, be baked in an oven. For example, the coated substrate may be baked at temperatures of 200° C. or lower, such as 125-175° C.) for 10 to 60 minutes.

EXAMPLES

The following examples are offered to aid in understanding of the present invention and are not to be construed as limiting the scope thereof. Unless otherwise indicated, all parts and percentages are by weight.

Two (2) (meth)acrylic polymers were prepared as described in Examples 1 and 2. The (meth)acrylic polymer of Example 1 was prepared by emulsion polymerization techniques. The (meth)acrylic polymer of Example 2 was prepared by solution polymerization techniques, dispersed in water and neutralized with amine to form an anionic (meth)acrylic polymer.

In Example 3, the (meth)acrylic polymer of Example 1 was neutralized with amine and combined with additional aqueous medium, lithium-containing particles and electrically conductive carbon particles to form an electrodeposition bath.

In Example 4, the anionic (meth)acrylic polymer of Example 2 was combined with additional aqueous medium, lithium-containing particles and electrically conductive carbon particles to form an electrodeposition bath.

The electrodeposition baths of Examples 3 and 4 were then used to electrodeposit a coating on an aluminum foil that was to serve as a cathode in a lithium ion battery. The electrocoated cathodes were roll calendered and evaluated for ½ cell coin cell discharge capacities (mAh/g) at various discharge rates. The results are reported in Table I below.

Example 1

In a 4-neck, 2-liter glass reactor equipped with a temperature probe, nitrogen inlet, and stainless steel stir blade, the following materials are added: deionized (DI) water (460 g) and Rhodapex AB-20 (1 g). The reactor is heated to 75° C. under a nitrogen blanket with stirring. Concurrently, the pre-emulsion monomer feed containing DI water (200 g), Rheasoap SR10 (4.3 g), Rhodapex AB-20 (2.2 g), Triton N101 (4.3 g), 2-ethylhexylacrylate (147 g), butyl acrylate (18 g), 56 wt % solution of N-butoxymethylacrylamide in butanol (26.8 g), and methacrylic acid (120 g) is stirred for 30 minutes in a separate glass flask. Once the water solution in the reactor reaches 75° C., 5% of the pro-emulsion feed is added at once followed by stirring for 5 minutes. Next, a solution of DI water (28 g) and ammonium persulfate (0.5 g) is added at once to the reactor followed by stirring for 15 minutes. Next, the remainder of the pre-emulsion monomer feed and the initiator feed containing DI water (32 g) and ammonium persulfate (0.2 g) is added simultaneously in separate addition funnels over 150 minutes. After the feeds are complete, the mixture is stirred at 75° C. for 2 hours. After the 2-hour hold, the reaction is cooled to 30° C. and poured through a 10-micron filter bag into a suitable container. The resulting latex has a Tg −13° C., a weight average molecular weight (Mw) of 96400, pH=3, and particle size of 119 nm.

Example 2

In a 4-neck, 2-liter glass reactor equipped with a temperature probe, nitrogen inlet, and stainless steel stir blade, the solvent butyl cellosolve (174 g) is added. The reactor is heated to 140° C. under a nitrogen blanket with stirring. The monomer feed consisting of 2-ethylhexylacrylate (162 g), butyl methacrylate (36 g), 56 wt % solution of N-butoxymethylacrylamide in butanol (32.1 g), methacrylic acid (144 g), and tertiary-dodecyl mercaptan (11.3 g) is mixed and added into an addition funnel. The initiator feed consisting of Trigonox F-C50 (7.26 g) and butyl cellosolve (48 g) is mixed and added into a second addition funnel. Once the solvent in the reactor reaches 140° C., the monomer feed and initiator feed are added simultaneously in separate addition funnels over 180 minutes. After the feeds are complete, the addition funnel containing the monomer feed is rinsed with butyl cellosolve (12 g) and the reaction is stirred for 1 hour at 140° C. Next, a chaser feed containing Trigonox F-C50 (3.63 g) and butyl cellosolve (4.8 g) is added over 30 minutes. Then the initiator feed funnel is rinsed with butyl cellosolve (6 g) and the reaction is stirred for 90 minutes at 140° C. Next, the reaction mixture is cooled to 100° C. and DI water (20 g) warmed to 70° C. is added over 10 minutes and then the mixture is allowed to stir for 15 minutes. The following step is to cool the reaction mixture to 88° C. and begin addition of dimethylethanolamine (164.4 g) warmed to 70° C. over 1 hour. Then the feed is rinsed with butyl cellosolve (9 g) and the reaction is stirred for 15 minutes. Once this is complete, the resin is cooled to <80° C. and poured out into a suitable container. The resulting anionic (meth)acrylic polymer has a Tg −13° C., a weight average molecular weight (Mw) of 5556, and pH=8.9.

Example 3

35 grams of the (meth)acrylic polymer prepared as in Example 1 was added dropwise to a stirring solution of 4.2 grams of DMEA in 966.5 grams DI water. To prepare an electrodeposition bath, 86.5 grams of this anionic (meth)acrylic polymer was then diluted with 95 grams of DI water. Next, 6 grams of conductive carbon, C-Nergy™ Super C65 (commercially available from Timcal Ltd.), was added and then the mixture was sonicated for 25 minutes. 12.5 grams of LiFePO$_4$ (LFP) (commercially available from Phostech Lithium Inc.) was then added in 4 equivalent portions with each addition followed by 5 minutes of sonication. An additional 10 minutes of sonication was performed to ensure a uniform dispersion. Finally, 600 grams of deionized water and 74 grams of butyl cellosolve solvent were added to the bath. To perform coating by electrodeposition, a carbon coated aluminum foil (commercially available from MTI) was wired as an electrode and placed in the stirring 75° F. (24° C.) bath containing a thermocouple and heating/cooling coil that also acted as a counter electrode. The voltage was then turned on for 75 seconds at 75 volts with the current set to 1.5 amps. The coated foil was then allowed to dry at room temperature before heating to 150° C. for 20 minutes. The electrocoated cathode was then tested in a half-cell coin cell and the battery performance results are found in Table I.

Example 4

250 grams of the anionic (meth)acrylic polymer prepared as in Example 2 was added slowly to 300 grams of water while mixing aggressively with a Cowles blade mixer. To prepare an electrodeposition bath, 4.1 grams of the anionic (meth)acrylic polymer was then diluted with 176.8 grams of DI water. Next, 3.6 grams of conductive carbon, C-Nergy™ Super C65 (commercially available from Timcal Ltd.), was added and then the mixture was sonicated for 25 minutes. 15.5 grams of LiFePO$_4$ (commercially available from Phostech Lithium Inc.) was then added in 4 equivalent portions with each addition followed by 5 minutes of sonication. An additional 10 minutes of sonication was performed to ensure a uniform dispersion. Finally, 600 grams of deionized water and 74 grams of butyl cellosolve solvent were added to the bath. To perform coating by electrodeposition, a carbon coated aluminum foil (commercially available from MTI) was wired as an electrode and placed in the stirring 75° F. (24° C.) bath containing a thermocouple and heating/cooling coil that also acted as a counter electrode. The voltage was then turned on for 75 seconds at 100 volts with the current set to 1.5 amps. The coated foil was then allowed to dry at room temperature before heating to 150° C. for 20 minutes. The electrocoated cathode was then tested in a half-cell coin cell and the battery performance results are found in Table I.

TABLE I

| | | | | | Discharge C-rate (hrs.$^{-1}$) | | | | % capacity retention after 25 cycles at |
|---|---|---|---|---|---|---|---|---|---|
| Example | Exp't | Bath composition LFP/C65/Ionic (meth)acrylic polymer | pigment/ionic (meth)acrylic polymer weight ratio | Li/c | 0.2 | 1.0 | 1.6 | 6.4 | c-rate of 1 |
| 3 | 15-AHO-096-A-4 | 62.5/30/7.5 | 12.3 | 2.1 | 160 | 125 | 101 | 0 | 96.4 |
| 4 | 15-AHO-087-A-4 | 77.5/18/4.5 | 21.2 | 4.3 | 123 | 84 | 54 | 0 | 93.8 |

Whereas particular embodiments of this invention have been described above for purposes of illustration, it will be evident to those skilled in the art that numerous variations of the details of the present invention may be made without departing from the invention as defined in the appended claims.

Although various embodiments of the invention have been described in terms of "comprising", embodiments consisting essentially of or consisting of are also within the scope of the present invention.

What is claimed is:

1. A method of producing an electrode for a lithium ion battery comprising:
   immersing an electrically conductive substrate into an electrodepositable composition, the substrate serving as the electrode in an electrical circuit comprising the electrode and a counter-electrode immersed in the composition, a coating being applied onto or over at least a portion of the substrate as electric current is passed between the electrodes,
   the electrodepositable composition comprising:
   (a) an aqueous medium;
   (b) an ionic (meth)acrylic polymer; and
   (c) solid particles comprising:
      (i) lithium-containing particles, and
      (ii) electrically conductive particles; wherein the composition has a weight ratio of the solid particles to the ionic (meth)acrylic polymer of at least 4:1.

2. The method of claim 1, wherein the substrate is a foil comprising aluminum, iron, copper, manganese, nickel, a combination thereof, and/or an alloy thereof.

3. method of claim 1, wherein the ionic (meth)acrylic polymer is anionic.

4. The method of claim 1, wherein the ionic (meth)acrylic polymer is prepared by organic solution polymerization techniques.

5. The method of claim 1, wherein the ionic (meth)acrylic polymer is prepared by emulsion polymerization techniques.

6. The method of claim 1, wherein the (meth)acrylic polymer is prepared by polymerizing a mixture of (meth)acrylic monomers including a (meth)acrylic acid monomer and at least partially neutralizing the (meth)acrylic polymer with a base.

7. The method of claim 6 in which the (meth)acrylic acid is present in the mixture in an amount of at least 30 percent by weight based on total weight of the mixture of (meth)acrylic monomers.

8. The method of claim 6 in which the mixture of (meth)acrylic monomers includes a monomer having a Tg of −20° C. or less.

9. The method of claim 8, wherein the low Tg monomer is present in the mixture in amounts of at least 30 percent by weight based on total weight of (meth)acrylic monomer.

10. The method of claim 8 in which the low Tg monomer comprises 2-ethylhexyl acrylate and/or butyl acrylate.

11. The method of claim 1, wherein the lithium-containing particles comprise $LiCoO_2$, $LiNiO_2$, $LiFePO_4$, $LiCoPO_4$, $LiMnO_2$, $LiMn_2O_4$, $Li(NiMnCo)O_2$, and/or $Li(NiCoAl)O_2$.

12. The method of claim 1, wherein the lithium-containing particles are present in an amount of at least 50 percent by weight, based on the total weight of the solids in the composition.

13. The method of claim 1, wherein the electrically conductive particles comprise electrically conductive carbon particles.

14. The method of claim 13, wherein electrically conductive carbon particles comprise carbon black.

15. The method of claim 1, wherein the composition has a weight ratio of the lithium-containing particles to the electrically conductive particles in the composition of at least 3:1.

16. The method of claim 1, wherein the composition has the weight ratio of the solid particles to the ionic (meth)acrylic polymer of at least 8:1.

17. The method of claim 1, wherein the composition has a total solids content of 1 to 5 percent by weight, based on the total weight of the composition.

18. An electrodepositable composition comprising
   (a) an aqueous medium;
   (b) an ionic (meth)acrylic polymer; and
   (c) solid particles comprising:
      (i) lithium-containing particles, and
      (ii) electrically conductive particles; wherein the composition has a weight ratio of the solid particles to the ionic (meth)acrylic polymer of at least 4:1.

19. The composition of claim 18, wherein the weight ratio is at least 8:1.

20. The composition of claim 18, wherein the ionic (meth)acrylic polymer is anionic.

21. The composition of claim 18, wherein the ionic (meth)acrylic polymer is prepared by organic solution polymerization techniques.

22. The composition of claim 18, wherein the ionic (meth)acrylic polymer is prepared by emulsion polymerization techniques.

23. The composition of claim 18, wherein the (meth)acrylic polymer is prepared by polymerizing a mixture of (meth)acrylic monomers including a (meth)acrylic acid monomer and at least partially neutralizing the (meth)acrylic polymer with a base.

24. The composition of claim 23 in which the (meth) acrylic acid is present in the mixture in an amount of at least 30 percent by weight based on total weight of the mixture of (meth)acrylic monomers.

25. The composition of claim 23 in which the mixture of (meth)acrylic monomers includes a monomer having a Tg of −20° C. or less.

26. The composition of claim 25, wherein the low Tg monomer is present in the mixture in amounts of at least 30 percent by weight based on total weight of (meth)acrylic monomer.

27. The composition of claim 25 in which the low Tg monomer comprises 2-ethylhexyl acrylate and/or butyl acrylate.

28. The composition of claim 18, wherein the lithium-containing particles comprise $LiCoO_2$, $LiNiO_2$, $LiFePO_4$, $LiCoPO_4$, $LiMnO_2$, $LiMn_2O_4$, $Li(NiMnCo)O_2$, and/or $Li(NiCoAl)O_2$.

29. The composition of claim 18, wherein the lithium-containing particles are present in an amount of at least 50 percent by weight, based on the total weight of the solid particles.

30. The composition of claim 18, wherein the electrically conductive particles comprise electrically conductive carbon particles.

31. The composition of claim 18, wherein the composition has a weight ratio of the lithium-containing particles to the electrically conductive particles in the composition of at least 3:1.

32. The composition of claim 18, wherein the composition has a total solids content of 1 to 5 percent by weight, based on the total weight of the composition.

* * * * *